United States Patent [19]

Beck

[11] Patent Number: 4,735,429

[45] Date of Patent: Apr. 5, 1988

[54] SAIL ATTACHMENT FOR BICYCLES AND THE LIKE

[76] Inventor: Joseph J. Beck, 2797 S. Main St., Salt Lake City, Utah 84115

[21] Appl. No.: 855,887

[22] Filed: Apr. 24, 1986

[51] Int. Cl.$^4$ ............................................. B62B 15/00
[52] U.S. Cl. .................... 280/213; 114/102; 280/289 R
[58] Field of Search ............... 280/213, 289 R, 289 A, 280/289 G, 289 S, 810, 16; 180/2.2; 114/97, 98, 99, 100, 102, 103, 90, 91

[56] References Cited

U.S. PATENT DOCUMENTS

| | | | |
|---|---|---|---|
| 639,107 | 12/1899 | Sorenson | 280/213 |
| 2,038,166 | 4/1936 | Deal | 280/213 |
| 2,831,447 | 4/1958 | Hanna | 114/102 |
| 3,557,733 | 1/1971 | Mathieu | 114/102 |
| 3,874,313 | 4/1975 | Doepner | 114/102 X |
| 3,994,508 | 11/1976 | Danner | 114/102 X |
| 4,441,728 | 4/1984 | Schroeder | 280/213 |
| 4,453,482 | 6/1984 | Barker | 114/98 |

FOREIGN PATENT DOCUMENTS

| | | | |
|---|---|---|---|
| 3241131 | 5/1984 | Fed. Rep. of Germany | 114/103 |
| 883258 | 6/1943 | France | 280/213 |
| 1488432 | 7/1967 | France | 114/102 |
| 256548 | 12/1985 | France | 114/103 |

Primary Examiner—John J. Love
Assistant Examiner—Charles R. Watts
Attorney, Agent, or Firm—Thorpe, North & Western

[57] ABSTRACT

A sail assembly for attachment to a bicycle having a frame, a rear wheel and a seat mounted on the frame forwardly of the rear wheel. The sail assembly includes a fork for bridging the rear wheel to mount on the frame and extend upwardly therefrom rearwardly of the seat. A boom is carried on the upper end of the fork to be generally horizontal and to pivot in a horizontal plane. A mast is mounted on the boom to extend upwardly generally in line with the fork, and a sail is attached at a leading edge thereof to the mast and at a lower edge to the boom. The fork is pivotally attached to the frame to enable pivoting rearwardly if the mast strikes an object while riding the bicycle. A flexure device restores the fork and mast to the generally upright position after the force which caused pivoting of the mast is removed. A flexure device also allows the boom to pivot laterally, but then restores the boom to a position generally in line with the bicycle after the force which caused the pivoting is removed.

22 Claims, 3 Drawing Sheets

SAIL ATTACHMENT FOR BICYCLES AND THE LIKE

BACKGROUND OF THE INVENTION

This invention relates to a simplified sail structure which may be attached to conventional bicycles or similar vehicles of locomotion.

There have been a number of proposals for mounting a sail or sail assemby on a bicycle for being propelled by the wind. See, for example, U.S. Pat. Nos. 3,986,722, 4,557,495, 3,994,508, 2,038,166, 947,701 and 639,107. Many of these earlier proposals involve mounting the sail in a location where the bicycle rider could, to a certain extent, control the positioning of the sail. Of course in attempting to control the position of the sail, the rider would normally have to yield some control over the bicycle itself. Many of the proposals also called for provision of a fairly large sail surface area utilizing a loose sail material. Employment of such a large sail may provide the desired motive power, assuming the wind is blowing in the appropriate direction, but it also can give rise to instability and loss of control of the bicycle if a sudden wind shift or gust of wind occurs. Finally, many of the proposals suggest mounting the sail on the front or side of the bicycle at a location where it could potentially interfere with the operation and steering of the bicycle or at least the vision of a rider.

SUMMARY OF THE INVENTION

It is an object of the invention to provide a new and improved sail attachment for mounting on vehicles of locomotion such as bicycles, tricycles and other vehicles operated by one or two riders in the open.

It is another object of the invention to provide a sail attachment which is positioned on the vehicle so as not to interfere either with the operation of the vehicle or the vision of the rider.

It is a further object of the invention to provide a sail attachment which will provide suitable motive power, when there is a wind, and yet is also stable.

It is an additional object of the invention to provide a sail attachment which may be utilized free of the need of manual control by the rider.

It is a further object of the invention to provide a combination sail and bicycle or similar vehicle which is simple in design, construction and maintenance.

The above and other objects of the invention are realized in a specific illustrative embodiment of a sail assembly for mounting on a riding vehicle having a frame, a seat, and wheels for carrying the vehicle. The sail assembly includes a sail support structure mounted on the frame rearwardly of the seat, an elongate boom mounted on the support structure to be generally horizontal, a mast mounted on the boom to extend upwardly therefrom, and a sail attachable at a leading edge to the mast and at a bottom edge to the boom. The sail includes a generally rigid upper, trailing and bottom edge, and an interior which is generally flexible.

In accordance with one aspect of the invention, the sail support structure is mounted to pivot rearwardly when struck by a force and is further attached to the frame by a flexure device which allows the support structure to pivot rearwardly, but not forwardly, and which urges the support structure, after pivoting, back to its initial support position.

In accordance with another aspect of the invention, the boom is mounted to pivot in the horizontal direction. Another flexure device is provided to allow the boom to pivot and then urge the boom back to a position generally in line with the upright plane defined by the vehicle.

In accordance with still another aspect of the invention, the sail is mounted to pivot about the mast but to be urged back to a position generally above the boom.

BRIEF DESCRIPTION OF THE DRAWINGS

The above and other objects, features and advantages of the invention will become apparent from a consideration of the following detailed description presented in connection with the accompanying drawings in which:

FIG. 1B is an enlarged cross-sectional view of stiffener element 100 of FIG. 1A, taken along lines 109;

FIG. 1C is an enlarged, cross-sectional view of the sail and mast of FIG. 1A, taken along lines 81;

FIG. 5B is an enlarged, cross-sectional view of the sail leading edge of FIG. 5A, taken along lines 58.

DETAILED DESCRIPTION

Figure 1A:
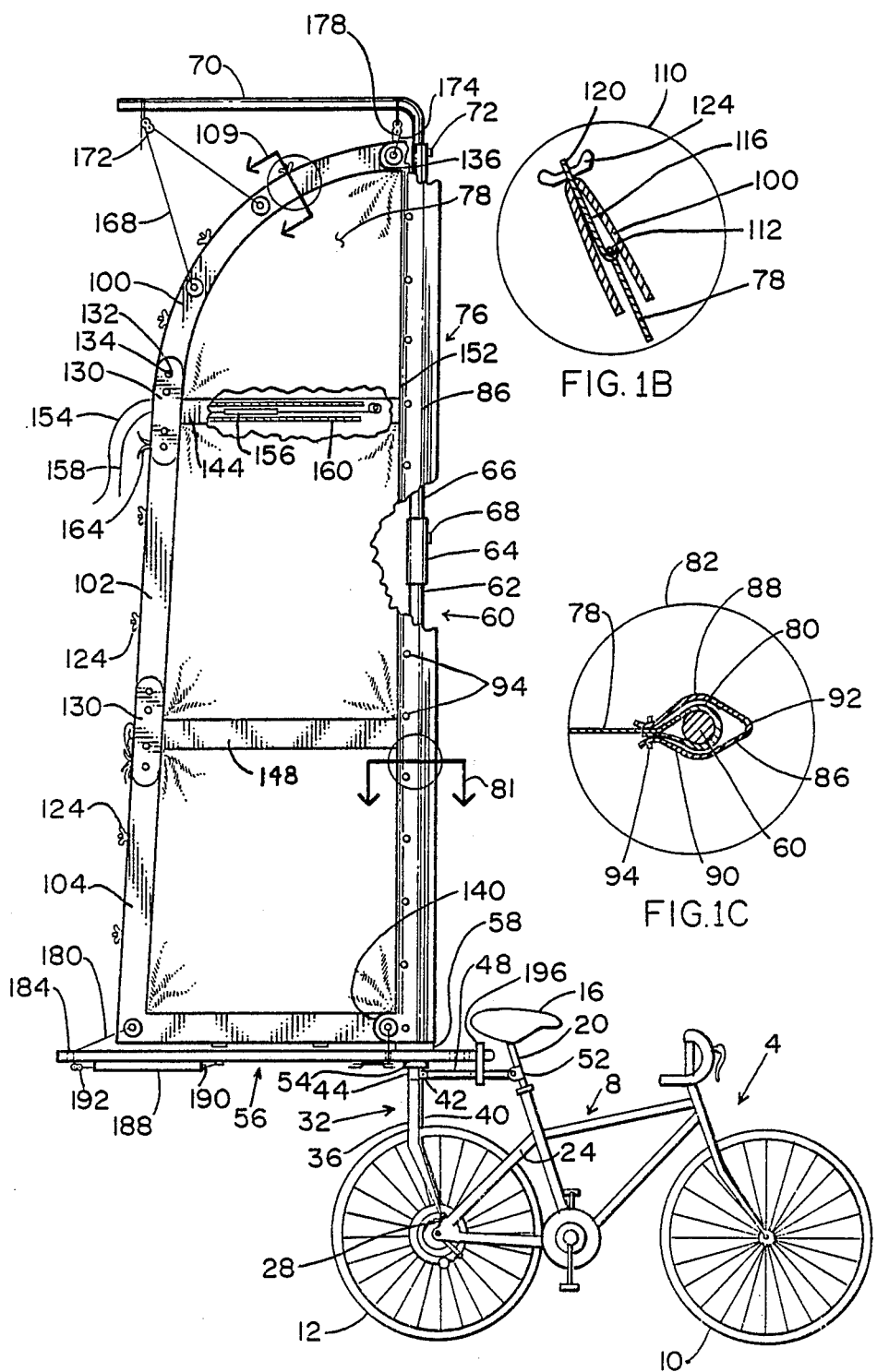
FIG. 1A is a side, elevational, partially cut away view of a sail assembly mounted on a bicycle and made in accordance with the principles of the present invention.
Figure 2:
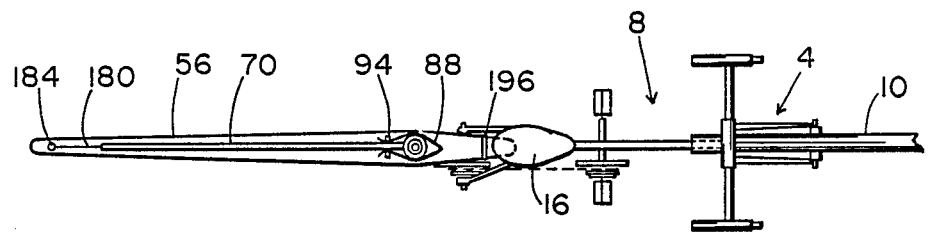
FIG. 2 is a top plan view of the structure of FIG. 1.

Referring to FIGS. 1 and 2, there is shown one illustrative embodiment of the invention in side, elevational and top, plan views respectively. The sail assembly of the invention is designed for mounting on a conventional bicycle 4 having a frame 8, a front wheel 10, a rear wheel 12 and a seat 12 mounted by way of a seat post 20 to the frame. A portion of the frame 8 includes a rear wheel brace 24 which, in turn, typically includes fender eyelets 28. The wheel brace 24 bridges the wheel 12 to connect to the axle of the wheel in a conventional manner.

Figure 4:
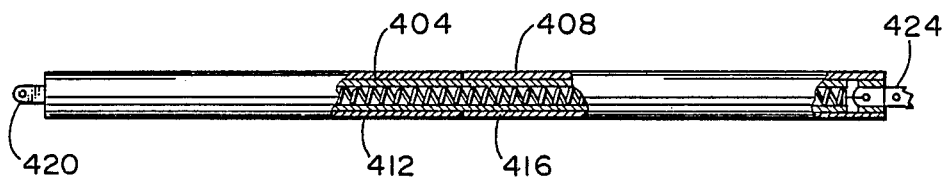
FIG. 4 is a side, elevational, partially cut away view of the flexure device used in the structure of FIG. 3.

The sail assembly of the present invention includes a support structure 32 in the form of a fork having two legs 36 and 40 which bridge the rear tire 12 and are pivotally attached by screws or other fixtures to respective eyelets 28 of the brace 24. A cross brace 44 joins the tops of the two legs 36 and 40 and is joined by way of a bracket 46 to one end of a tubular flexure device 48. The other end of the flexure device 48 is joined to a bracket 52 mounted on the seat post 20. The tubular flexure device 48 is shown in greater detail in FIG. 4 to include two outer tubes 404 and 408 positioned end-to-end, a one piece inner tube 412 slideably disposed within the two outer tubes, and a spring 416 disposed within the inner tube. The spring 416 extends substantially the full length of the inner tube 412 and the two outer tubes 404 and 408, with each end of the spring being attached to connector elements 420 and 424 fixed in the non adjoining ends of the outer tubes 404 and 408. With this arrangement, the two outer tubes 404 and 408 may be pulled apart longitudinally (extended) when subjected to a force and the spring 416 will urge the tubes back together again when the force is removed. The inner tube 412 prevents bending of the flexure device. Such a flexural device design is known in the art.

Joining the brace 44 (FIG. 1) to the seat post 20 by means of the flexure device 48 allows the support structure 32 to be pivoted rearwardly when subjected to a force and to be pulled back to the normally upright position, as shown in FIG. 1, when the force is removed. The advantage of this will become apparent after a discussion of the sail assembly which is mounted on the support structure 32 since, if the sail assembly strikes an overhanging object when being used, it will have the capability of pivoting rearwardly out of the way to avoid upsetting the bicycle and rider.

Figure 3:
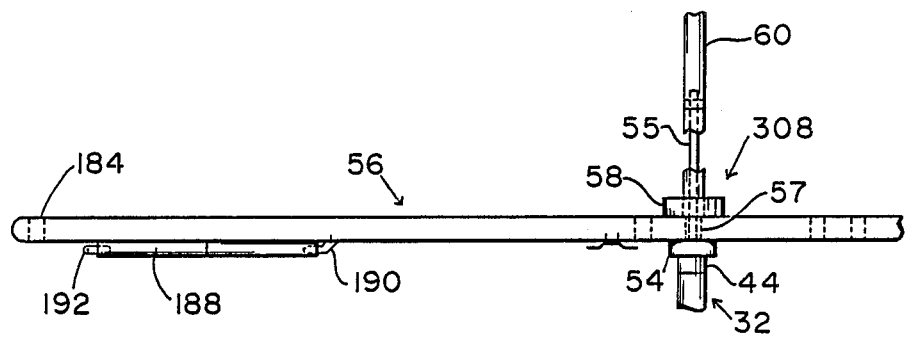
FIG. 3 is a side, elevational partially fragmented view of the boom, mast and support structure used in the FIG. 1 structure.

Mounted on the top end of the support structure 32 is a boom 56. The boom 56 is mounted to extend rearwardly of the seat 116 in a generally horizontal position and in line with an upright plane defined by the bicycle (also see FIG. 2). The boom 56 may illustratively comprise a generally flat, elongate piece of wood mounted near its forward end to the top of the support structure 32 as best seen in FIG. 3. A bearing 54 is positioned between the support structure 32 and the boom 56 to allow the boom to pivot horizontally with respect to the support structure. A center support rod 55 extends from the support structure 32, and in particular from the cross brace 44, upwardly through the bearing 54 and through an opening 57 in the boom 56. A hollow mast 60 is mounted on the boom 56 by way of a collar brace 58 so that the support rod 55 extends upwardly through the center of the mast. The support rod 55, in effect, acts as a pivot axis for the boom 56, collar brace 58 and mast 60, all of which are joined by fasteners, adhesive or the like to pivot on bearing 54.

Referring again to FIG. 1, the mast 60 is shown to extend upwardly from the boom 56, generally in line with the upright support structure 32. The mast is comprised of two segments, including a lower segment 62 having a sleeve 64 mounted on the top thereof, and an upper segment 66, the lower end of which is fitted into the sleeve 64 and held in a colinear relationship with the lower segment 62 by way of set screw 68. Fitted in the upper end of the upper section 66 of the mast is a gaff 70 (in the form of a rod) formed to extend upwardly and then rearwardly as shown in FIG. 1. The gaff is held in place in the upper end of the section 66 by way of a set screw 72.

A sail assembly 76 is provided for attachment at a leading edge to the mast 60 to extend rearwardly therefrom. The mast assembly includes a generally flexible sheet of material 78 made, for example, of canvas, heavy plastic, etc. The leading edge of the material 78 is looped to form a generally vertically extending channel 80 which is fitted about the mast 60 as best seen in the balloon 82 which is an enlarged top, cross-sectional view of the sail and mast, taken along lines 81. Fitted about the leading edge of the sail material 78 and the mast 60 is a substantially rigid leading edge structure 86. This structure may be made of hard plastic, aluminum, or similar rigid material. As best seen in the balloon 82, the leading edge structure 86 is formed with two side walls 88 and 90 joined together to form a sharp edge or point 92 at the forward end, and looped rearwardly about the mast 60 where it is joined by snaps or similar fastening elements 94.

The top, trailing edge, and bottom of the sheet of material 78 are made substantially rigid by stiffener elements 100, 102 and 104. The stiffener element 100 is curved as shown in FIG. 1, while stiffener element 102 is generally straight, and stiffener element 104 is formed into an L shape. Each of the stiffener elements 100, 102 and 104 has a generally V-shaped cross section as shown in the balloon 110 which is an enlarged, cross-sectional view of stiffener element 100 taken along lines 109. Fitted within the V (between the two legs) of the stiffener element 100 is the upper edge (or trailing edge for the other elements) of the sheet of material 78. The material 78 is reinforced at its edge to receive a hook 112 which is formed at the lower end of a shank 116, the upper end 120 of which is threaded. A wing nut 124 is then screwed onto the threaded end 120 to make contact with the trailing edge of the stiffener element 100 to hold the shank 116 in place and thereby hold the material 178 in the stiffener element. If it is desired to increase the tension or taughtness of the material 178, then the wing nut 124 can be tightened to draw the material further into the stiffening element 100. Alternatively, to loosen the material 178 the wing nut 124 may simply be unscrewed.

The stiffener elements 100, 102 and 104 are joined together by clamps 130 which are similar to bicycle chain links. The clamps 130 include openings 132 which are snapped over posts 134 extending outwardly from the opposite sides of the stiffening elements. With clamps 130 positioned on both sides of the stiffening elements at the joint thereof, a substantially rigid trailing edge is provided for the sail assembly 76. The stiffening element 100 is similarly joined to the leading edge structure 86 by inserting it in a bracket 136 formed integrally with and to extend rearwardly from the leading edge structure. A similar bracket 140, formed integrally with and extending rearwardly from the leading edge strucure 86, is used to join the stiffening element 104 to the leading edge structure.

Formed in the flexible sail material 78 are two pockets 144 and 148 which extend from near the leading edge of the sail assembly 76 to the trailing edge thereof. The pockets 144 and 148 may be formed simply by sewing or attaching an elongate strip of material at its edges to the sail material 78. Disposed within each pocket near the leading edge of the sail assembly is a pulley, such as pulley 152, which is held in place in the pocket by grommets or similar fastening elements. A tether 154 extends through an opening in the stiffening element 100 into the pocket 144 lengthwise to the pulley 152 and then about the pulley back to one end of an elongate, generally rigid plug 156. The other end of the plug 156 is joined to another tether 158 which extends through the pocket 144 and out an opening in the stiffening element 102. By pulling on tether 154, the plug 156 is made to move forwardly in the pocket 144, whereas pulling on tether 158 causes the plug 156 to move rearwardly. By proper positioning of the plug 156 in the pocket 144, the camber of the sail material 78 can be varied. That is, if the plug 156 is located more forwardly in the pocket 144, then a greater camber will result near the trailing edge of the sail assembly 76 and vice versa. Advantageously, a batten 160 is positioned in the pocket 144 to contain the plug 156 and allow it to slide within the batten. The batten 160 may simply be a piece of plastic tubing or similar tubing which can flex laterally but not longitudinally. The batten would help to form the camber of the material 78, with the plug 156 determining that portion of the batten which is maintained to be curve or camber free.

The tethers 154 and 158 may be tied to a tie element 164 (which is mounted on stiffener element 102) after positioning of the plug 156 has been done.

As shown in FIG. 1, the stiffening element 100 is tied by means of a string or tether 168 to a pulley 172 attached to the gaff 70. Similarly, the upper portion of the sail assembly may be attached by string or tether 174 to a pulley 178, also attached to the gaff 70.

The lower end of the sail assembly is attached near the trailing edge to a tether 180 which extends through an opening 184 in the boom 56 and is tied to one end of a flexure device 188. The flexure device 188 is similar to flexure device 48 as earlier described and is fitted on the bottom of the boom 56, with one end 190 being attached to the boom, and the other end 192 being attached to the tether 180. When the trailing edge of the sail assembly 76 pivots laterally about the mast 60, the tether 180 is pulled upwardly through the opening 184 to stretch the flexure device 188 and urge the trailing edge of the sail assembly back to a position generally in line and above the boom 56. The trailing edge of the sail assembly 76 may pivot laterally in either direction and be urged to return to its initial position by the flexure device 188.

As before mentioned, the boom 56 is mounted at the top of support structure 32 to pivot in the horizontal direction. It is desired that the boom be maintained generally in line with the upright plane in which the bicycle 4 lies and this is accomplished by placing a flexible, resilient ring 196 about the forward end of the boom and about the flexure device 48. The ring 196 will flex to allow the boom 56 to pivot laterally in either direction but will exert a force on the forward end of the boom to urge the boom back to its normal position.

As is evident from the above description, the sail assembly 76 may be pivoted in a number of directions. Included in these is the capability of the entire assembly pivoting rearwardly and then being urged back into position by flexure device 48. Also, the rear of the sail assembly 76 may be pivoted laterally about an axis which is coincident with the mast 60, and then be urged back to its normal position by flexure device 188. Finally, the entire boom 56, with mast 60, may be pivoted about an axis which is generally coincident with the mast 60 and then urged back in line with the bicycle 4 by the flexible, resilient ring 196.

Figure 5A:
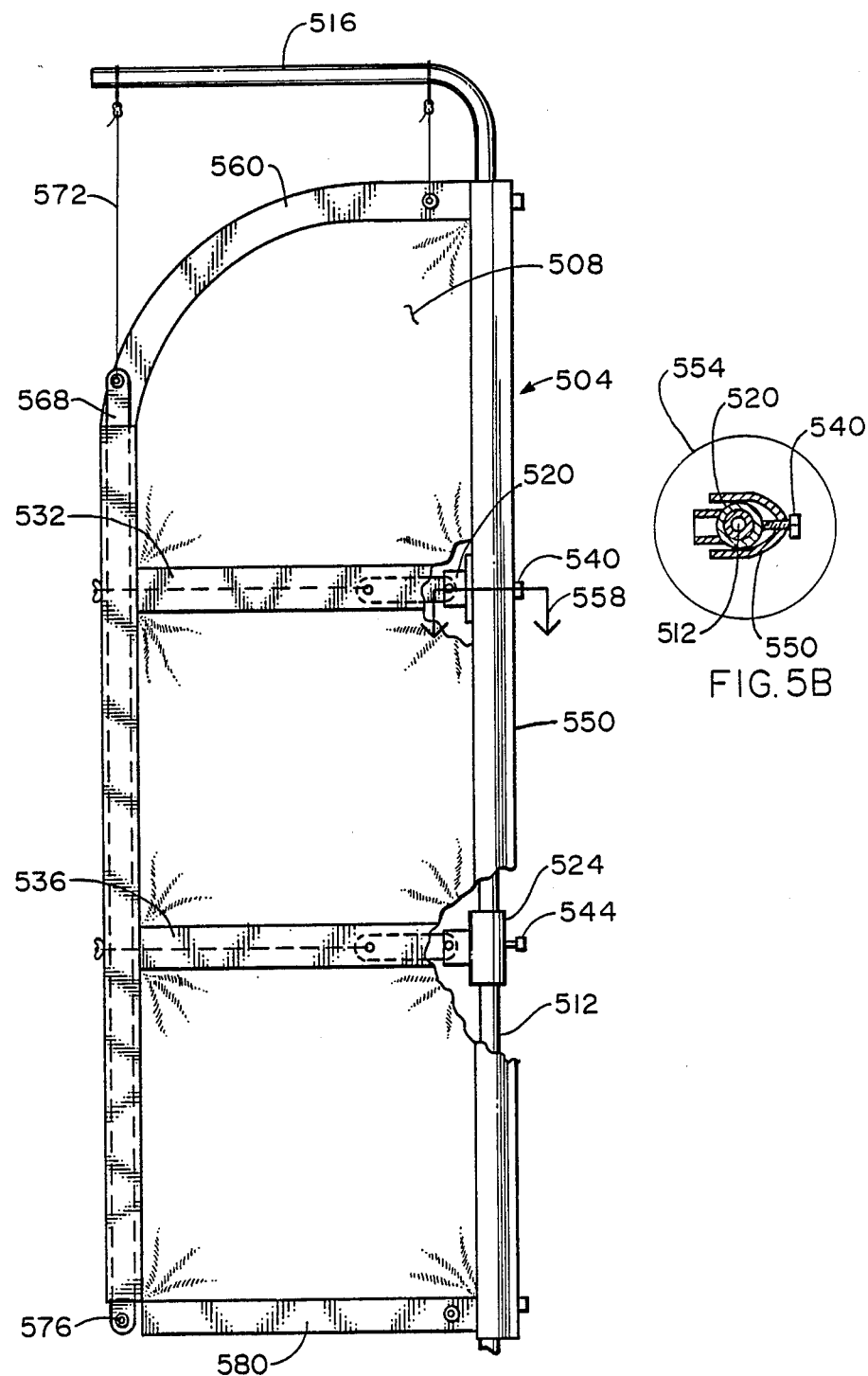
FIG. 5A is a side, elevational view of an alternative embodiment of a sail assembly also made in accordance with the principles of the present invention.

FIG. 5 shows an alternative embodiment of a sail assembly 504 made in accordance with the present invention. The sail assembly 504 is similar to that shown in FIG. 1 in that it includes a sheet of flexible material 508 whose leading edge is looped around a mast 512. The mast 512 extends upwardly, as before, and includes a gaff 516 which extends rearwardly to provide support for the sail assembly. Positioned at spaced apart locations along the mast 512 are T-connectors 520 and 524. The T-connectors 520 and 524 are positioned coincident with the front end of pockets 532 and 536 in which plugs, shown in dotted outline are positioned as in the embodiment of FIG. 1. Pulleys would be mounted in the T-connectors 520 and 524 to allow wrapping tethers thereabout to provide for moving the plugs either forwardly or rearwardly. The T-connectors are held in place about the mast 512 by set screws 540 and 544.

Positioned about the leading edge of the sail material 508 is a hard leading edge 550 which has a generally V-shaped cross section as best seen in the balloon 554 taken along lines 558. The set screw 540 holds the hard leading edge 550 in place about the T-connector 520.

The sail assembly 504 also includes a stiffener element 560 similar to stiffener element 100 described in connection with FIG. 1. The trailing edge of the sail assembly 504 is formed with a pocket 564 into which is inserted an elongate substantially rigid bar 568. The upper end of the bar 568 is tied by tether 572 to the gaff 516. The lower end of the bar 568 is coupled to a tether 576 which would be connected through an opening in the boom to a flexure device as described for FIG. 1. The bar 568 is held taut between tethers 572 and 576 so as to act as a pivot axis for the sail material 508. A stiffener element 580 is provided at the bottom edge of the sail assembly 504 to provide bottom rigidity from the front to the back just as stiffener element 560 provides top rigidity. The elements 560 and 580 respectively receive and hold the upper and lower edges of the sail material 508 by adhesive, fasteners, or similar mechanisms.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. In combination with a bicycle having a frame, a rear wheel, and a seat mounted on the frame forwardly of the rear wheel, a sail attachment comprising a fork pivotally mounted at its lower end on the frame about a transverse axis, said fork extending upwardly form the frame and bridging the rear wheel, flexural means coupling the upper part of the fork forwardly to the frame for allowing the fork to pivot rearwardly when subjected to a force, and for urging the fork forwardly to a generally upright position, a boom carried by the fork at the upper end thereof to be generally horizontal, a mast mounted on the boom and extending upwardly therefrom generally in line with the fork, and a sail attached at a leading edge to the mast and at a lower edge to the boom.

2. A sail attachment as in claim 1 further including a gaff mounted on the top of the mast and extending rearwardly thereof, and tether means for tying the top of the sail to the gaff to support the sail.

3. A said attachment as in claim 2 wherein the sail is formed with a generally rigid trailing edge.

4. A sail attachment as in claim 3 wherein said mast comprises a plurality of sections which may be fitted together to form the full-length mast, or separated into individual sections, and wherein the trailing edge of the sail comprises a pluraltiy of stiffening elements which may be separated from the rest of the sail and from each other, or which may be joined together and to the rest of the sail to stiffen substantially the entire trailing edge of the sail.

5. A sail attachment as in claim 3 wherein said sail comprises a sheet of flexible material which is generally impervious to air, a front edge of the material being formed for attachment to the mast, and elongate stiffener means attached along its length to the trailing edge of the material.

6. A sail attachment as in claim 5 wherein said stiffener means comprises a generally flat elongate element having a slot which extends the length of the element at a forward edge for receiving a rear edge of the sheet of material.

7. A sail attachment as in claim 6 wherein said sail further comprises manually manipulable means positioned on a rearward edge of the elongate element for selectively drawing the sheet of material into the slot or releasing the sheet of material from the slot, to thereby selectively vary the tension in the sheet of material.

8. A sail attachment as in claim 7 wherein said manually manipulable means comprises
 a plurality of tensioning screws fitted in the elongate element at spaced-apart locations, one end of each of which is attached to the trailing edge of the sheet of material and the other end of which is threaded and positioned to slideably protrude out a rearward ege of the elongate element, and
 a plurality of wing nuts, each of which is screwable onto the protruding end of a respective tensioning screw.

9. A sail attachment as in claim 5 further including one or more pockets formed in the sheet of material extending from the front to the rear thereof, and one or more elongate plugs, each shorter in length than and disposed in a respective pocket, and means for selectively moving the elongate plugs forwardly or rearwardly in a respective pocket to thereby vary the chamber of the sheet of material in the horizontal direction.

10. A sail attachment as in claim 9 further including one or more laterally bendable tubular battens, each disposed in a respective pocket and containing a respective plug.

11. A sail attachment as in claim 5 further including a generally rigid sleeve having an oblong cross-section with a sharp front edge and an open rear edge, said sleeve being disposed about the mast so that the sharp front edge is directed forwardly and the open rear edge is attached to the sheet of material on both sides thereof.

12. A sail attachment as in claim 5 wherein the trailing edge of the sheet of material is formed with a generally vertical pocket, and wherein said stiffener means comprises an elongate bar fitted in and extending substantially the full length of the pocket.

13. A sail attachment as in claim 5 further including a generally rigid channel piece having a V-shaped cross-section, said channel piece being disposed about the mast with the apex of the V-shaped cross-section of the channel piece facing forwardly and the mast positioned within the channel.

14. A sail attachment as in claim 1 wherein said boom includes a bearing means for joining the boom to the fork to enable the boom to pivot horizontally about an axis generally coincident with the mast.

15. A sail attachment as in claim 14 further including second flexural means coupled between the boom and the frame for allowing the boom to pivot and to urge the boom back to a position generally in line with an upright plane defined by the bicycle.

16. A sail attachment as in claim 15 wherein said boom includes a forwardly projecting handle, and wherein said flexural means comprises an annular, resilient piece of material encircling the handle and a portion of the frame.

17. A sail attachment as in claim 1 wherein said flexural means comprises telescoping tubes, spring loaded to allow longitudinal flexing thereof.

18. A sail attachment as in claim 1 further including third flexural means coupled between the rear of the sail and the boom for allowing the rear of the sail to move laterally away from the boom when subjected to a force, and to for urging the sail back to a position generally above the boom.

19. A sail assembly for mounting on a riding vehicle having a frame, a seat and locomotion element for carrying the vehicle, said assembly including
 sail support structure mounted on the frame rearwardly of the seat,
 a generally horizontal boom mounted on the support structure,
 a mast mounted on the boom and extending upwardly from the boom, and
 a sail attached at a leading edge to the mast and at a bottom edge to the boom, said sail including a generally rigid trailing edge and flexible center section, said sail including one or more pockets extending from the front edge to the trailing edge, one or more elongate plugs, each disposed in a respective pocket, and means for selectively moving the elongate plugs forwardly or rearwardly in a respective pocket to thereby vary the chamber of the sail.

20. A sail assembly as in claim 19 further including means for mounting said support structure on the frame to pivot rearwardly when subjected to a certain rearwardly directed force and to pivot back to its initial position when the force is removed.

21. A sail assembly as in claim 19 wherein said boom includes bearing means for pivotally mounting the boom on the support structure about an axis generally coincident with the mast laterally in either direction when subject to a certain force in that direction and to pivot back to a position where the boom is generally in line with the vehicle when the force is removed.

22. A sail assembly as in claim 19 further including means for attaching said sail to the mast and boom to pivot about the mast laterally from the boom when subjected to a certain force, and to return to its initial position when the force is removed.

* * * * *